Sept. 16, 1958 C. J. FLOYD 2,852,770
RADAR SEARCH SYSTEM AND APPARATUS
Filed March 17, 1955 2 Sheets-Sheet 1
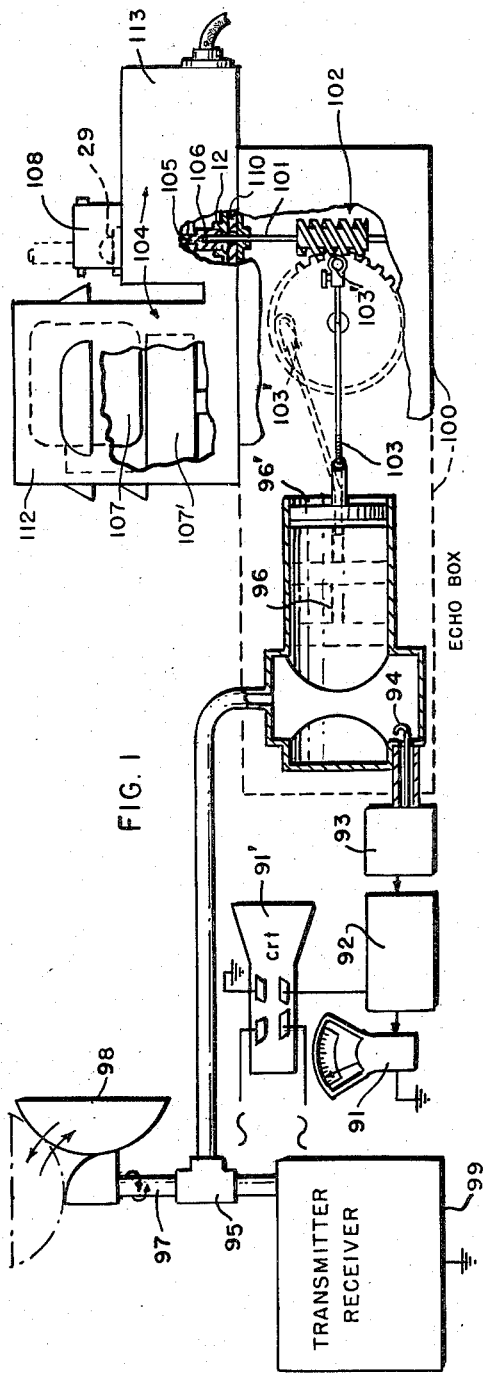
INVENTOR:
CULVER J. FLOYD
BY
Harry M. Saragovitz
Attorney Sept. 16, 1958  C. J. FLOYD  2,852,770
RADAR SEARCH SYSTEM AND APPARATUS
Filed March 17, 1955  2 Sheets-Sheet 2
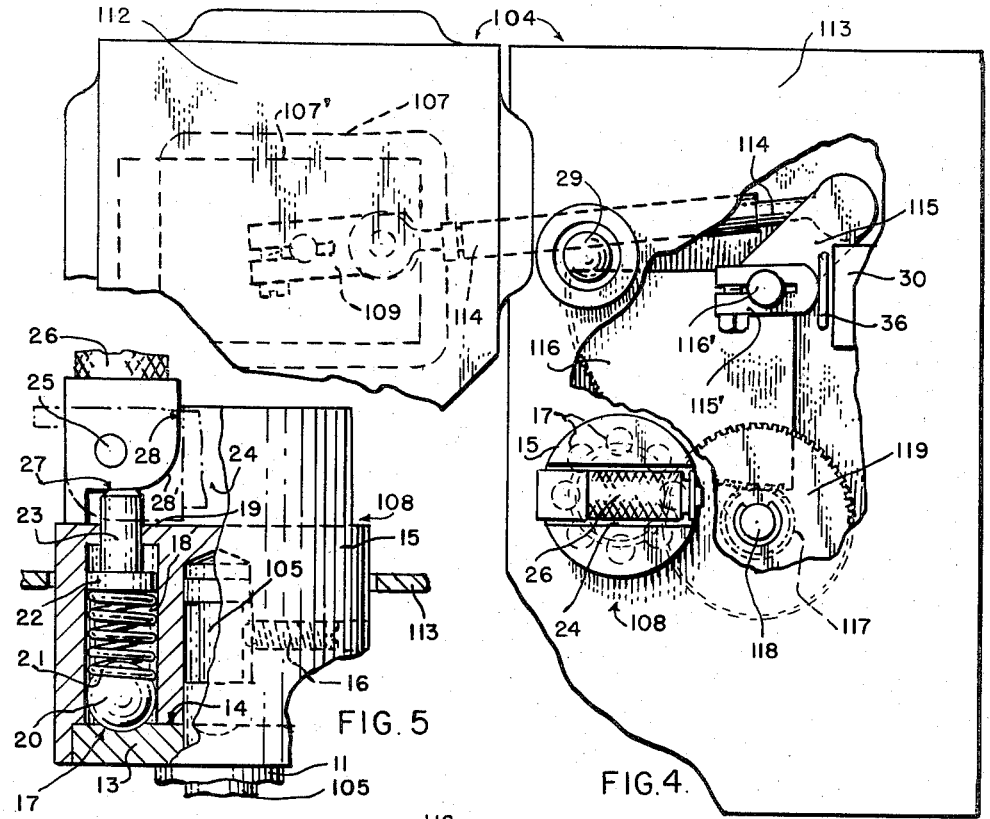
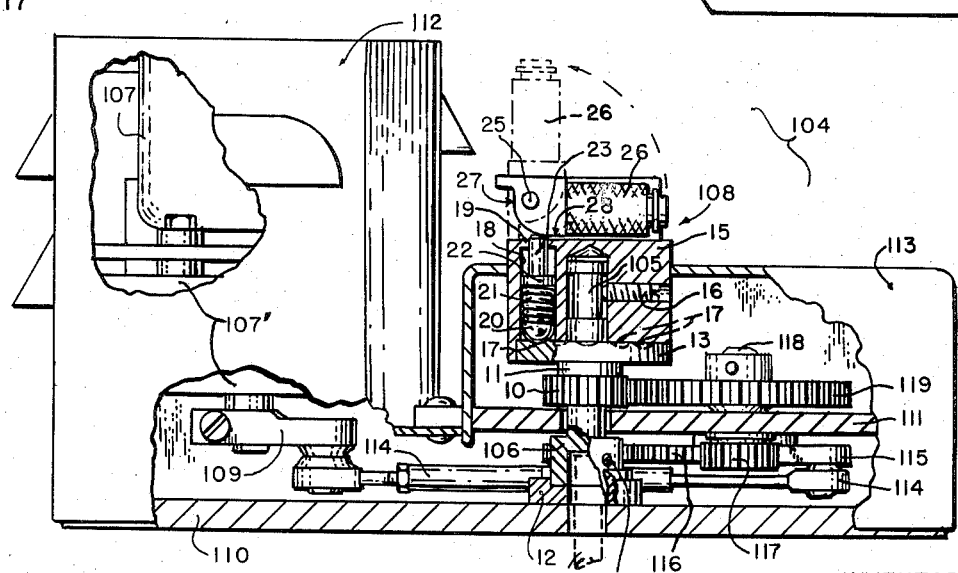
INVENTOR:
CULVER J. FLOYD
BY
Harry M. Saragovitz
ATTORNEY

United States Patent Office 2,852,770
Patented Sept. 16, 1958

2,852,770

RADAR SEARCH SYSTEM AND APPARATUS

Culver J. Floyd, West Peabody, Mass., assignor to the United States of America as represented by the Secretary of the Army Application March 17, 1955, Serial No. 495,070

7 Claims. (Cl. 343—17.7)

The invention relates to the operation of radar search systems, and particularly to means to evaluate the signals received and to assure maintaining an adequate pulse quality and power output in the transmitted pulses with great definiteness so that by relation of the received echo signals certain effects will be manifest and determinable.

While evaluation of transmitted pulse values has been carried out by manual tuning of an echo, it is a specific aim of this invention to enable the operation of the measuring system in a novel way, so that a minimum of attention from operating personnel will be required, manual tuning eliminated, and a material reduction in other control operations made possible.

It is an important aim of the invention to present novel means for initiation and automatic sustained operation of a pulse analysis device for a limited time sufficient to warrant computations based on manifestations derived from conventional radar apparatus.

It is an important further object to introduce a novel repetitious operation of an echo box at a frequency of tuning or cycling through a predetermined limited sweep automatically so that a reliable manifestation of the values being sought may be quickly obtained, without involving attention to the connectors, couplings or conventional manipulations of a tuner by the observer when making observations of significant qualities of the transmitted signals, while also permitting manual tuning at will, and adjustment of the moment of maximum resonance with any angular position of certain operating members and the antenna for echo reception (it should be understood, as will appear, that during normal target echo reception for display on the standard search radar oscilloscope, the echo-box hereinafter described is in detuned position, and so—together with its coupling—has no material effect on the received target echo signal, which is utilized in the usual way in the receiver and on the screen of the search radar. In fact owing to the extreme attenuation of the target echo and lack of amplification, the small component which could reach the echo box could not—at any position of the resonator—produce a perceptible effect in the ring time figure manifest at the cathode ray tube 91').

It has been known heretofore to apply a motor drive to a tunable echo box of the type illustrated herein, to repeatedly sweep a band of frequencies while a button switch is held closed.

A further important purpose of the invention is to offer such a system which is peculiarly adapted to operate by the mere momentary closure of a button switch or the like, to effect the demonstration required over a time adequate to the proper utilization of the information evolved, to permit corrections by adjustment of parameters or otherwise, and to terminate automatically the automatic operation of the echo box at a detuned condition.

The specific use of the present invention is in a radar search system, and particularly in a meterological system called a storm detection radar. In such apparatus, a pulse transmitter is connected to a rotating directional beam paraboloid antenna, the latter being also connected to a receiver during the intervals between the transmitted pulses; the transmitted pulse and the echo signal in the receiver being indicated conventionally on a cathode ray indicator.

Due to the fact that the quality of the echo signal in comparison with the transmitted pulse has significance in some ways pertinent to the nature of the reflecting mass, it is necessary that it shall be possible to indicate on demand the amplitude or power value, pulse shape, duration, noise level, or other characteristics of the transmitted signals during a period when the target echo signals are being analyzed.

The device has the conventional utility in determination of the frequency spectrum of the transmitter; checking for multiple moding of the transmitted signal, and analysis of the pulse form in accordance with Fourier.

This invention aims also to evolve a novel clutch device and adjustable coupling, capable at one condition of allowing movement of a driven member relative to a driving member through stages of movement at each of which the member is yieldably retarded, but operable to act as a coupling lock of the members at any of such stages. It is also sought to devise the mechanism so that it will at the same time at any stage automatically act to uncouple the members in case of an emergency or accidental blockage of the driven member, so as to avoid breakage of gearing or other parts.

It is a further object of the invention to present a novel means for utilizing a spring-pressed ball or bullet detent type of clutch, constructed for easy manual adjustment of the coupled members angularly in relation to each other and easily manipulated for locking the coupled parts together, yet which will be safe against accidental driving of the driven apparatus beyond proper limits of movement.

The clutch feature as disclosed is applied to adjust the time of sweep of an automatically operated tuning piston in an echo box in relation to the scan position of a search antenna.

It is a special object to present a mechanism readily applicable to a directional search radar, to operate a variable cavity resonator repeatedly through a predetermined range of frequency resonance and to enable its quick and certain manual adjustment in relation to the angular position of the search antenna and locking in adjustment without interference with the search function.

Additional objects, advantages and features of invention reside in the construction, arrangement and combination of parts involved in the embodiment of the invention, and methods employed, as will be understood or apparent from the following description, or as specifically stated therein, and/or from the accompanying drawings, wherein:

Figure 1 is a schematic partly structural diagram of a system embodying the invention.

Figure 2 is a typical diagram of electrical circuitry for an automatic timed operation of the automatic tuning unit.

Figure 3 is an elevation partly in section of the automatic operating unit.

Figure 4 is a plan view of the structure in Figure 3, partly in section.

Figure 5 is an enlarged vertical section of the clutch device released.

Referring more particularly to the drawing, there is illustrated a radar transmitter-receiver 99 of conventional kind adapted to search, object detection, and direction and range-elevation determination, as discretion may dictate. A search antenna 98 of the parabolic reflector type (rotating in azimuth and also oscillating in elevation) is formally indicated, to which a wave guide 97 is extended from the transmitter-receiver.

The parts shown in Figures 1 and 2 are customarily mounted as a group unit revoluble on a base adapted to be set up on a suitable platform. Cathode ray tube or tubes for presenting to search personnel images derived from target echoes are generally mounted at a console remote from the antenna group unit. The tube unit 91' of Fig. 1 may be located at the console if desired.

An echo box (a tunable cavity) 96, of well known form is coupled to the guide 97 by some form of directional vestigial coupler at 95. The details of this coupler, the means for antenna operation, and circuitry of the transmitter-receiver being well known in the art, and as they contain no novel invention per se, are not illustrated. The arrows above the reference character 97 in Fig. 1 indicate the rotational capabilities of the unit apparatus as indicated. The marking "Transmitter-Receiver" in Figure 1, represents an extensively used radar search assembly embodying features above-mentioned, and in its latest form embodying the present invention. The details of the rotating unit indicated are fully illustrated in "TM 11–1304" obtainable from the Office of Technical Services, U. S. Department of Commerce.

At times, under response to closing of appropriate circuit by the user, signals passing through the wave guide are resonated in the echo box picked up by the probe loop 94 and communicated through a rectifier 93 and amplifier 92 to a transducer-indicator 91 (which, for instance, may be a D'Arsonval galvanometer calibrated in watts or otherwise, appropriately for the research to which the apparatus is applied), and to an auxiliary cathode ray tube 91'. The line by which the pulse fraction to be examined or analyzed is communicated to the echo box may be one of a kind heretofore known and used in such transmission, coaxial cable with inductive probe coupling loops having been used in some cases, and a wave guide form also being possible as shown (note Patent No. 2,497,222 and see TM 11–1304 before mentioned). While the echo box is capable of returning to the receiver a response which may be read on the scope of the standard radar apparatus without amplification, the elements 94, 93, 92 and 91' are shown for convenience in disclosing in general the function of the apparatus, and because this auxiliary tube would be especially desirable in case of the use of an extreme attenuation at the coupler 95; or— when a P. P. I. scan is employed in the receiver 99—because the "ring" and "grass" pattern of an A-scan scope located at 91' might be preferred for indicating the values of the transmitted pulse.

The echo box is part of a unit 100, heretofore well known, containing means for moving the piston 96' of the tunable cavity throughout its desired travel by means of a driven input shaft 101 designed for manual use (although motor driving means controlled by a manual switch has been used), and a suitable gearing transmission 102 of conventional form, terminating with a flexible strip or tape connector 103 (corresponding to a connecting rod) connected between a crank 103' and the piston 96'. This prior apparatus also includes dial and pointer means (not shown) for indicating the frequencies to which the cavity is resonant at the various positions of the piston throughout its travel. Only a small part of such travel is used at any one time or occasion in the practice of this invention, although different parts of this travel may be used on different occasions, for resonating respective frequencies.

Thus, the invention comprises the prior practice of an automatic repetitious operation of the piston by reciprocation over a small part of its path. In a typical prior embodiment of the unit 100 referred to in the above named publication TM 11–1304, the total movement of the piston permits tuning of frequencies in the range 8990 to 9610 megacycles (mc.). The part of this range used for a single operation or indication in this invention has customarily been a band width of 50 mc.

Output of an automatic drive unit 104 (Fig. 4) is transmitted by direct coupling to the driven or input shaft 101 (Figs. 1 and 2) of the Echo Box unit 100 from an output shaft 105 as at 106, Fig. 1, and the drive unit will turn these shafts through several turns and then reverse the movement, repeating this cycle as long as the motor 107 in the unit 104 operates.

To permit accommodation of the limited tuning sweep of the piston to different frequencies and so that the sweep will reasonate the middle of the selected band at a medial position in such sweep, a manually releasable clutch 108 is provided for coupling the automatic drive mechanism in the unit 104 to its output shaft 105. This is also useful in effecting coincidence of reasonance with training of the antenna axially on any target or object from which reflection signals are being received. It is usual and contemplated that the antenna 98 will be independently operated.

Referring further to the drawing, the automatic drive unit 104 comprises a base plate 110, a deck 111, having bell-like casings for the motor-gear box section 112 (at the left), and for a motion-conversion and clutch section 113 (at the right Fig. 3 and 4).

The motor 107 is connected to a motion-reduction train in gear box 107' having a terminal rotating crank 109 to which there is pivoted an adjustable-length rigid pitman 114, which extends from the section 112 through section 113, a distance to the right in Figures 3 and 4, where it is pivoted to an arm 115 of a sector gear 116 fixed on a vertical shaft 116' (Fig. 4) pivoted in the base plate 110 and deck 111.

The gear 116 is meshed with a pinion 117 on a shaft 118 (Fig. 3) extended upward from the base plate 110 and through the deck 111, where a large spur gear 119 is fixed on the shaft above the deck 111. This large gear 119 is meshed with a terminal pinion 10 of the gear train in the section 113, the pinion having a hub 11 revoluble on the shaft 105 before named. This shaft is journalled at the deck 111 and extended therebelow, where it is provided with a coaxial socket piece 106, open downwardly, stepped in a bushing 12 secured upon the base plate and adapted to receive therethrough the shaft 101 when the unit 104 is set upon the unit 100. This socket piece 106 receives therein the upper end of the operating shaft 101 of the echo box unit, secured therein by means of a set screw 106'. The hub of the pinion 10 is formed with a clutch plate 13 thereabove, having an upper planiform face 14 in a plane normal to the shaft 105, which extends through and above this face a distance into a knob 15 to which it is secured by a set screw 16 engaged through the knob and against the shaft. The underside of the knob is relieved to form a concentric recess into which the plate 13 is set, the knob having a suitable face resting rotatably on the plate 13. The top face 14 of the plate 13 is formed with a multiplicity of circular indentations 17 in a series concentric with the axis of the shaft 105, and the knob is formed with a vertical bore 18 aligned with one of the indentations opening against the plate 13 and reduced by a shoulder 19 at its upper end. In this bore a ball detent 20 is freely movable, pressed downwardly against the plate 13 by a spring 21 confined by the head 22 of a plunger 23 extended upwardly through the reduced bore. The ball is of a size to enter into any indentation aligned therewith. A peculiar relationship between the spring, plunger and ball distinguishes this detent arrangement from the conventional one. That is to say, with the plunger at the upper limit of its movement, the spring is yieldable to the ball, but with the plunger pressed downward a maximum distance, the ball being engaged in one of the identations, the spring is compressed to solid closed form, and the ball serves as a positive clutch lock or detent, causing the knob and a connected shaft to be positively rotated by the clutch drive plate 13. The upper side of the knob is flat and formed with a diametrical channel 24 wider than the bore 18; and pivoted upon a pin 25 set across this channel there is a lever 26, having a cam face 27 at its end of small radius in relation to the pin and having also a heel cam face 28 of greater radius, arranged to bear upon the plunger when the lever is laid in the slot, and hold the plunger in the solid-spring compressing position above referred to. The cam face 27 will relieve the spring sufficiently to permit the ball to ride up from an indentation 17 on to the top face of the plate 13, and so permit manual adjustment of the knob by an indexing movement around the drive plate 13. When the lever is lowered into the knob, locking the clutch connection, its outer end is exposed at the periphery of the knob where it is manually accessible.

It will be seen that, during operation of the automatic drive means the lever 26 is in lowered position locking the plate 13 to the knob 15. A quick flip of the outer end of the lever upwardly will permit the plunger to rise thereunder and hold the lever in elevated position as shown in Figure 5. The shaft 105 and mechanism in the echo box unit will then become stationary, and may be manually operated by rotation of the knob 15 with the same effect as in prior manual use of the echo box. The piston may thus be adjusted medially of the sweep for the frequency band involved, and when the antenna 98 comes to the azimuth position at which a target has been indicated, the motor 107 being in operation, the lever 26 is quickly depressed, locking the plate 13 to the knob 15.

In case a target echo signal has not been satisfactorily distinguished, the automatic operation of the echo box may be initiated at any time by pressing the button at 29 (described below), to evaluate the transmitted pulse, making it possible for the observer to make more certain that an effective pulse is being sent, and, by comparison, determine and evacuate the characteristics of received echo signals.

It should be noted that between the cam face 27 and the cam face 28 there is a spiral surface 28' which, under action of the spring 21—once the lever is started toward raised position—will cause the plunger 23 to rotate the lever and complete movement of the lever to full raised position. It is also to be noted that the beginning of this spiral cam surface is slightly inward on the knob beyond the axis of the plunger when the lever is lowered. This distance is small enough so that the friction of the plunger and cam is sufficient ordinarily to keep the lever in lowered position under ordinary conditions, but should there be a blockage of the piston at either limit of its movement in the resonating cavity, or of the sector 116 at either limit of its movement the component of torsion in the pressure of the plunger against the lever cam will overcome the friction and move the lever toward raised position, relieve the spring, and permit rotation of the clutch drive plate 13 relatively to the knob 15. To facilitate this automatic release of the clutch the pivot pin may be located slightly outward of the axis of the bore 18, toward the left in Figures 3 and 5.

For operation of the automatic drive unit, means is provided whereby this will be instituted by the momentary pressing of a button switch 29 conveniently located. This switch may be on the case of the unit 100, or on the unit 104, or at a remote console (not shown) where an auxiliary cathode ray tube 91' may be included if desired. Similarly, the indicator device 91 may be conveniently located adjacent the conventional cathode ray tube or scanning screen of one of the conventional scan systems. Thus, an observer need not leave the radar scope while initiating the operation of the echo box, or during operation thereof, in order to observe the indications derived from the functions of the echo box. Thus, it is made possible for some adjustments of parameters or other elements of transmitter or receiver to be made while indications of values at the conventional radar scan scope or at 91 or 91' continue.

The electrical circuits for operation of the echo box cycling motor 107 include a stop circuit independent of the switch 29, but opened at 30 by an arm 115' or other device connected with the sector gear 116 whenever the latter is at one limit of its oscillation. As shown in Figures 2 and 4, the stop arm 115' is adjustably secured on the upper end of the shaft 116' of the sector gear 116, and is utilized to hold open a stop control switch 30, otherwise normally closed, by which a circuit to the motor will remain closed except when the sector 116 is at a detuning position dotted in Figure 2. This circuit extends from the service line wire 31 through wire 32 to the pivot of the normally open-switch-arm armature 33 of a normally deenergized relay 43; thence to contact 34 engaged by the free end of the armature 33 at its released position; thence by wire 35 to the pivot of the switch arm of the stop control switch 30; to contact 37 and then by lead wire 38 to the brush 39 of the motor 107. The other brush, 39', of the motor is connected by a line 41 to the opposite side 40 of the service line. Whenever this circuit is closed it will immediately operate the motor and move the sector 116 to dotted position, there opening the switch 30. Thus, the motor cannot continue to operate on this circuit. However, it assures positioning of the sector 116 at one limit of its movement before the circuit is opened which becomes important in the automatic operation of the apparatus.

The starting switch 29, normally open, closes a circuit from line wire 31 through wire 42 to the brush 39, and also through wire 42' to one side of a holding relay coil 43 and 44 to an automatic reset timer switch 45, which thereupon closes a circuit therethrough including wire 46 to the other side of the coil 43, drawing the armature 33 from contact 34 to a contact 47 connected to wire 42'. The armature 33 is connected by wire 32 to the line as before mentioned, so that the timer now assures holding of the circuit through the motor. The timer may be of a conventional construction, and other hook ups and timer arrangements may be alternatively used as found appropriate there being numerous such devices commercially available. Some are described in "Timing Engineering" by Myrten G. Saake, Ribble Engineering Co., Jersey City, N. J., 1953 edition; pages 48 and following therein.

The timing device 45 is preferably set for some sufficient time (five minutes having been found practicable) to enable effective evaluation of performance of the radar, showing either satisfactory performance, or requiring correction or adjustment indicated at 91 and/or 91'.

It is customary in such radar search to operate the search antenna in azimuth at a rate of ten revolutions per minute or with a duration of six seconds for each scan of 360 degrees of azimuth, and also with the present invention it is the practice to operate the unit 104 to sweep the selected 50 mc. band of frequency at the same intervals of time. That is to say, the piston 96' will complete a reciprocation or sweep to and fro over the selected 50 mc. band every six seconds. By using synchronous motors for operating the antenna 98 and at 107, or a conventional selsyn control of one motor responsive to the other, the arrival of the piston of the echo box at a position of maximum resonance for the frequency being transmitted will occur at the same angular azimuthal position of the antenna each time, and by means of the clutch device disclosed, this resonance may be brought about at the moment when the antenna is trained in azimuth on the object from which a significant signal has been returned by reflection of the radar pulses. It should be understood, however, that this has no material effect on the echo signal from an actual target passing to the receiver, since the infinitesimal component of such echo derived from usual couplers would in this case be too small to produce an interfering resonation in the echo box without amplification. The practice enables testing of the transmitted pulse at this azimuthal direction, for use in interpreting (by comparison) the receiver-amplified target echo indication on the radar search screen derived from such transmitted pulse.

It is contemplated, however, that either the antenna or the echo box may be operated at a rate which is a multiple of the rate of the other. This may be desirable where the antenna is operated over only a small angle, in azimuth, covering a sector of terrain of special interest.

Where the antenna is also oscillatable for determining elevation of a located object, it may be either manually or automatically so oscillated, and any known means for stopping the vertical oscillation at some chosen elevation may be utilized. Various other expedients may be devised and employed for effective use of the invention without departing from the spirit of the essentials of the invention disclosed.

There is also indicated in the circuitry a positive stoppage switch 48 for instant manual stoppage of the tuner piston 96' of the echo box. It is shown connected in series in the line 41 to the motor. While the hook-up is shown as a series one through the motor, timer and switch devices, a multiple arrangement may be devised in accordance with familiar practice, if desired.

It may be noted that when the lever 26 of the clutch is raised, manual turning of the knob 15 will, through shaft 101 operate the piston 96' and so change the tuning relation of the piston to the angular position of the antenna, (the sweep of the latter and the piston cycle being in synchronism, as before stated). Raising of the lever 15 may be termed "declutching," as it frees the knob for manual adjustment relative to the mutually clutching drive plate 13.

In testing a radar set up by use of the echo box, it is of course necessary to use a pulse repetition frequency which will afford sufficient intervals for the presentation of the ring time figure from one pulse before the interposition of effects of a succeeding pulse. Customarily, search radars have two or several alternative pulse frequency settings usable at will, and a long interval rate is instituted when the echo box is used. It is also a practice at times to stop rotation of the antenna at the azimuth position from which an echo is received or anticipated, while the echo box is used to test the transmitted signal.

In some systems, the coupling between the wave guide and echo box is utilized to transmit the resonations of the pulse back to the wave guide and to the receiver for display on the search radar oscilloscope.

What is claimed is:

1. In a radar object detection search system having a pulse transmitter and a receiver and object image displaying screen, a variable cavity resonator operatively associated with the output of the transmitter, tunable to resonate a band of frequencies including medially therein the assigned frequency of the transmitter, motor means having a cyclical mechanical linkage to the said resonator to repetitiously vary the volume of the cavity throughout resonance in a given band of frequencies on each cycle of the mechanical linkage, the said cycle being a multiple of the pulse times of said transmitter, a first motor-operating circuit including a normally open starting switch; wherein said system includes automatic means in said first motor-operating circuit responsive to momentary closing of said starting switch to hold said first motor-operating circuit closed and including a circuit-breaking timer responsive to closure of said starting switch to open the first motor-operating circuit at the end of a predetermined period, a separate motor-operating circuit, separate means responsive to opening of the first motor-operating circuit by said timer to close the separate motor-operating circuit, and means in said mechanical linkage including a switch in said separate motor-operating circuit and a switch-opening member operative at a terminal part of each cycle of the mechanical linkage to open the switch last named, said resonator being connected with said mechanical linkage so as to be detuned in relation to the said assigned frequency of the transmitter at said terminal part of the cycle of the mechanical linkage, whereby normal radar reception of echoes by the receiver may occur without operation of said resonator.

2. The structure of claim 1 including a clutch in said mechanical linkage releasable at will to disconnect the said resonator from the motor, and including two mutually clutching revoluble members, one operatively connected to the resonator and manually operable while declutched to vary the resonance of the resonator in relation to the cycle of said mechanical linkage.

3. A storm-locating radar search system comprising a beam transmitting azimuth sweep search antenna, means to cyclically sweep the antenna through a given angle of azimuth, means to transmit pulses of a predetermined carrier frequency to the antenna, a receiver electrically coupled to the antenna for receiving target echo reflections of said pulses, means coupled to the receiver responsive to target echo reflections of said pulses passing through the receiver to display a graphic representation of such target echo reflections, a tunable cavity resonator, means to couple at least a vestige of transmitted pulses to said resonator, automatic means to rapidly and repeatedly tune the cavity of the resonator through a limited band of frequencies including the said predetermined carrier frequency in cycles of the same recurrence frequency as the cycles of sweep of the antenna, means connected with the resonator to register significant characteristics of a resonation of at least one of said transmitted pulses, and mechanical means operable at will to adjust the said automatic means so as to control the times of maximum resonation of the said predetermined carrier frequency in said cycles of tuning of the cavity of the resonator relative to the cyclic recurrence of a given azimuthal position of said antenna determined in relation to a manifest target echo reflection of the moment, whereby maximum resonance with transmitted pulses may be produced substantially coincidently with reception of reflections of such pulses originating at such target.

4. The structure of claim 3, in which said means to adjust times of resonance and azimuthal position comprises a drive unit including a motor and having a terminal rotary shaft, and said resonator comprises an echo box having a rotary input shaft to operate the same, a coupling for connecting the shafts, one said shaft projected from its unit to engage the coupling when the drive unit is set upon the echo box unit, said terminal shaft having a manual operating knob secured thereto, a drive train having a hollow terminal shaft revoluble around the first named terminal shaft, a concentric disc on and normal to the latter shaft, a wiper detent element slidable in the knob bearing on the disc, a protractile spring engaged against the detent element, a plunger on the spring, a cam lever pivoted outwardly of the spring, and having cam faces to engage the plunger and compress said spring at respective positions of the lever to vary the effectiveness of clutch engagement of the wiper element with the disc.

5. In apparatus of the character described, a clutch comprising a driven output shaft, a driving shaft revoluble therearound, a concentric drive disc on the latter, a knob fixed on the first shaft close over the disc, said disc having a concentric series of indents in its face next the knob, a bore being formed in the knob aligned with the series of indents, a dent slidable in the bore shaped to project into the indents singly, a helical spring in the bore seated against the detent, a plunger over the spring movable to a position in compression of the spring to solid form when the detent is engaged in an indent and having an opposite relieved-spring position, a lever pivoted in the outer part of the knob adjacent the axis of the bore, said lever having a cam face at the end to receive the plunger thereagainst at said relieved-spring position.

of the plunger, and with the lever at a release position limit of its movement, said lever having also a cam face of greater radius spaced angularly from the first named cam face to engage the plunger at a locking position of the lever, said spring being in solid closed form under the last named cam face when the detent is engaged in an indent.

6. The structure of claim 5, in which the pivot axis of the lever is transverse to the axis of the bore and the first cam face is a heel face on the end of the lever effective on the plunger when the lever is extended longitudinally of the axis of said shaft and knob outwardly from the knob, said knob formed to receive the lever at an opposite locking position in its pivotal movement so that it lies substantially across the knob, said second named cam face being on the side of the lever next to the knob when the lever is in locking position.

7. The structure of claim 6 wherein a spiral cam face is formed between the first named two cam faces, the second named cam face being slightly short of dead center position on the plunger when the lever is at locking position, whereby casual excessive pressure of the plunger against the second cam face will move the lever toward release position.

References Cited in the file of this patent

UNITED STATES PATENTS

| | | |
|---|---|---|
| 2,510,299 | Schramm | June 6, 1950 |
| 2,656,531 | Atlas | Nov. 1, 1955 |